Figure 1:
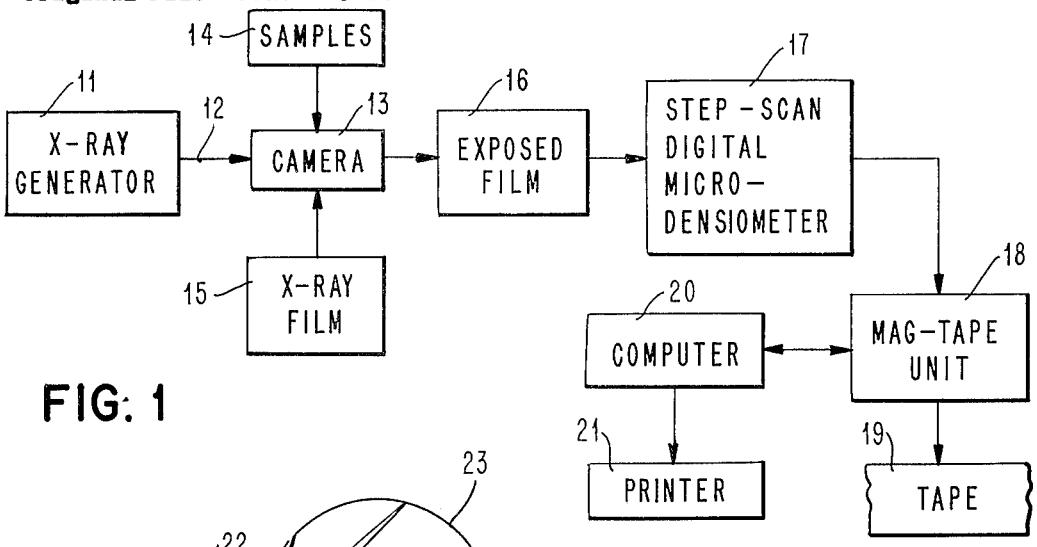
Figure 2:
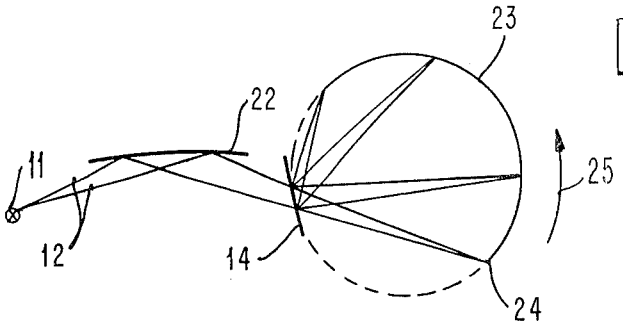
Figure 3:
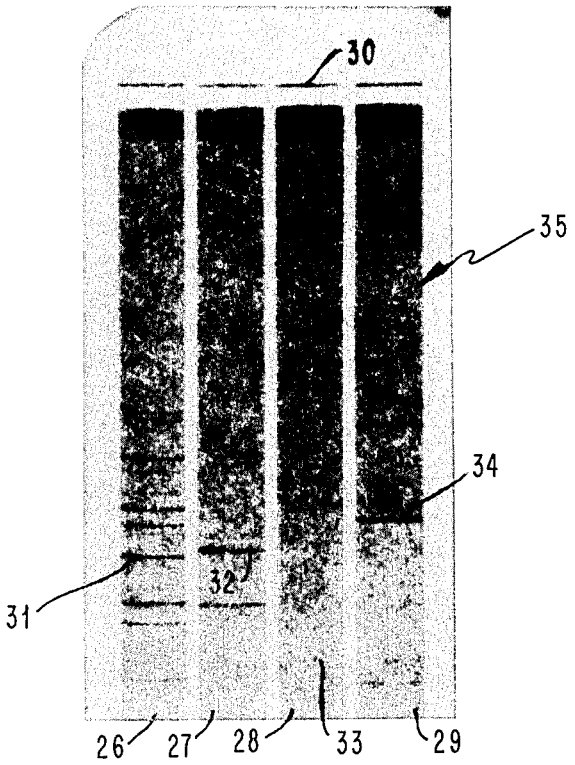
Figure 4A:
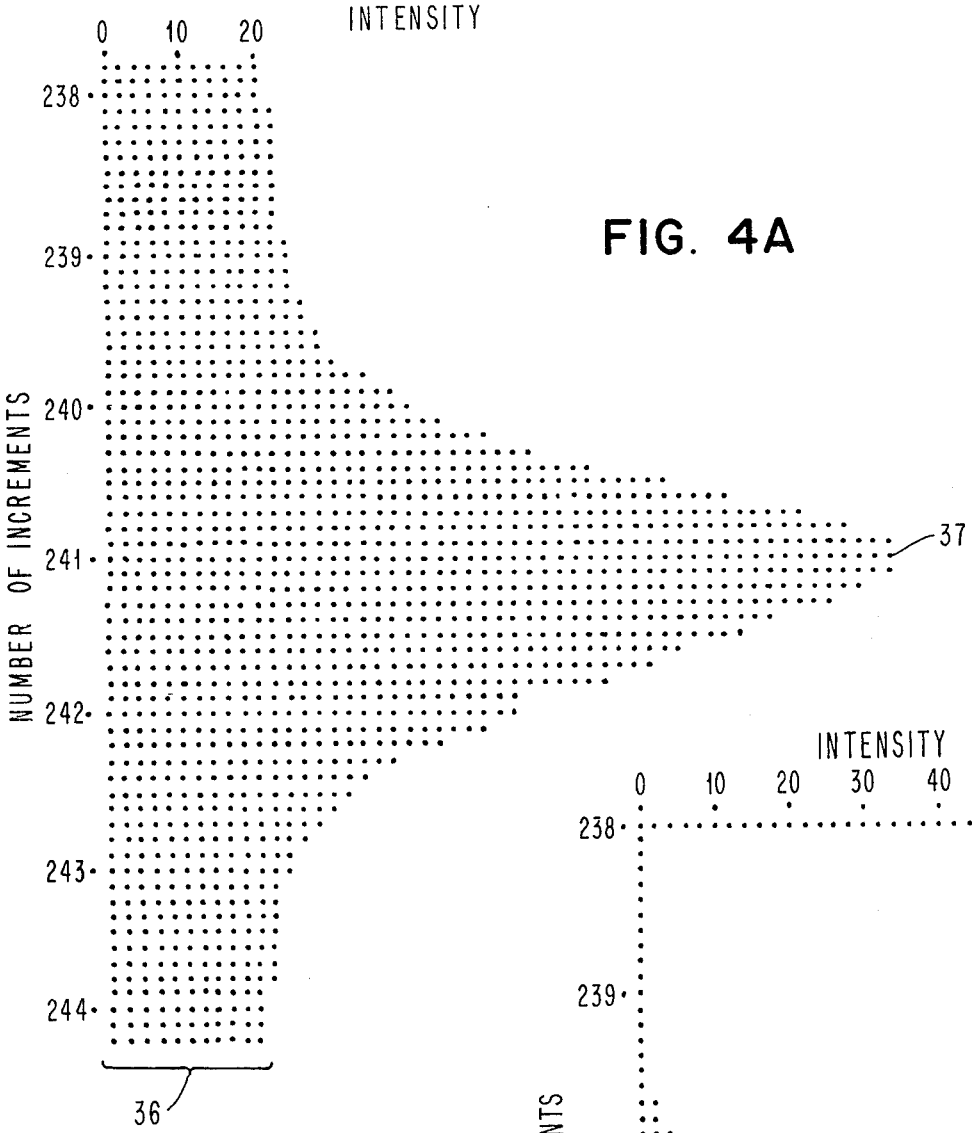
Figure 4B:
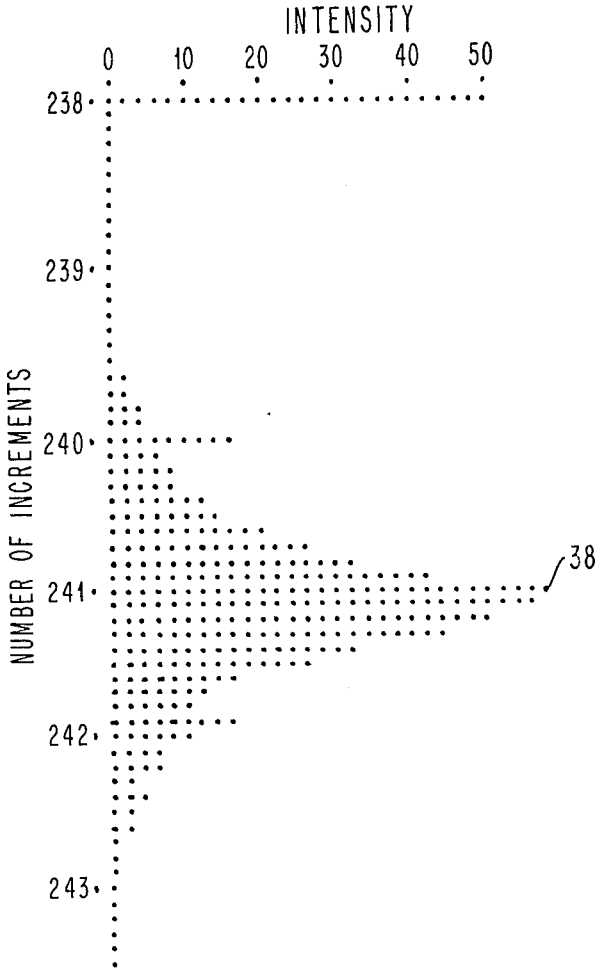
Figure 5:
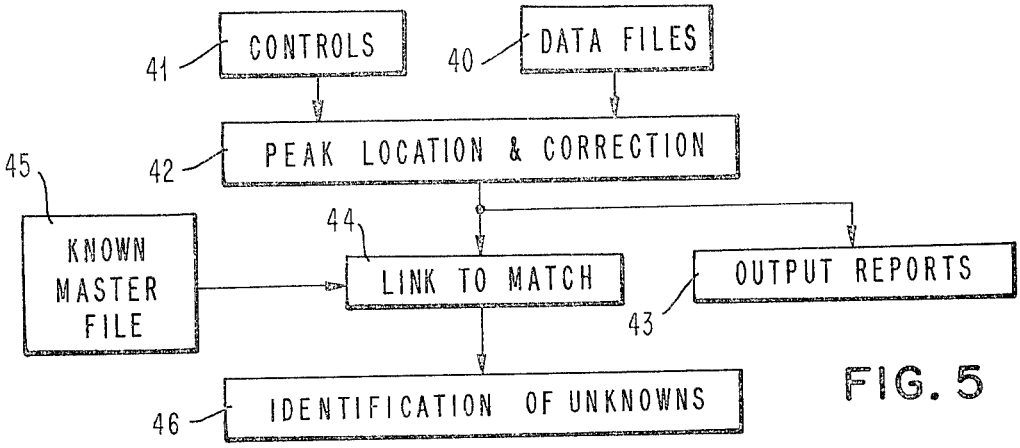
Figure 6:
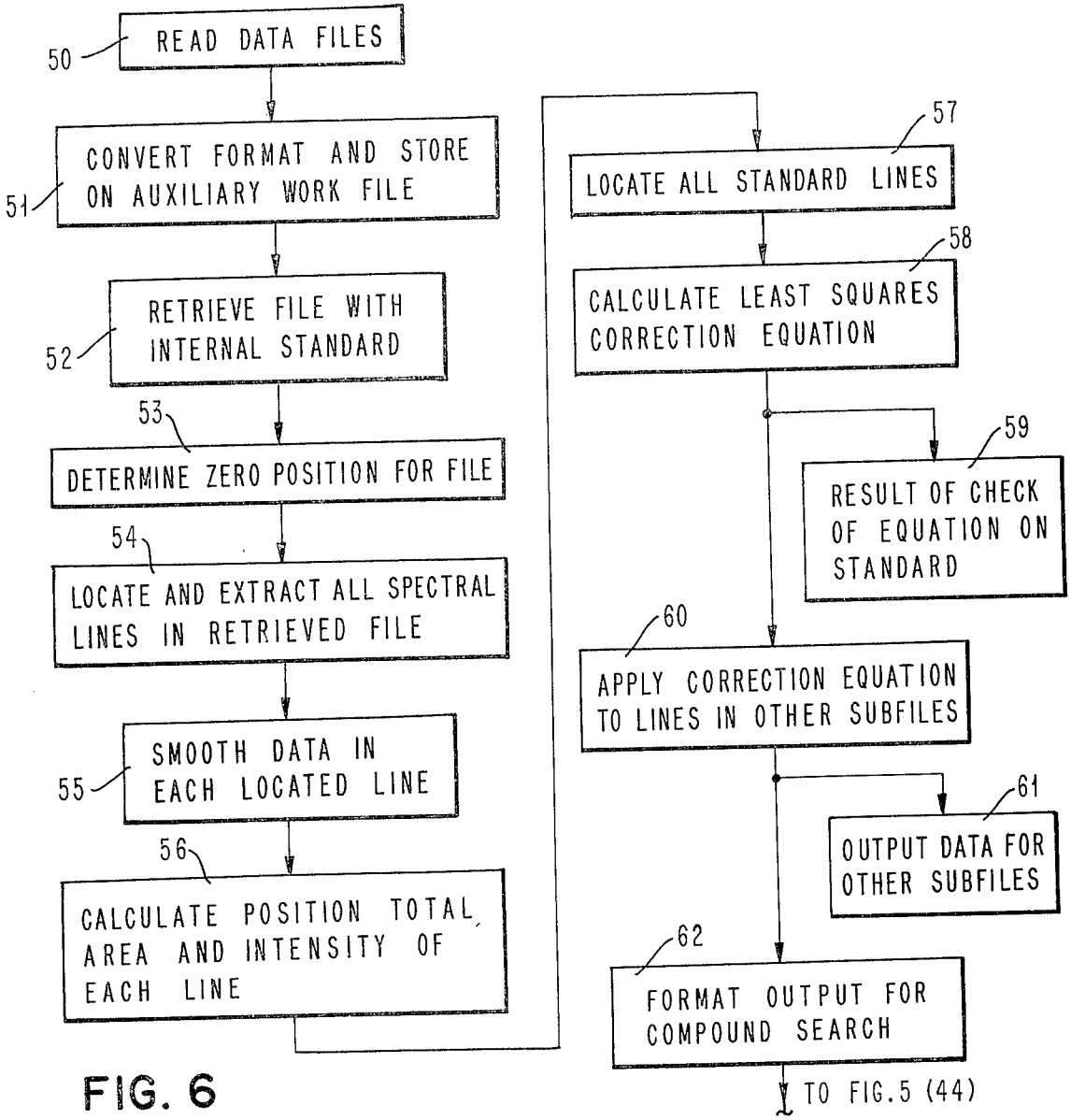
Figure 7:
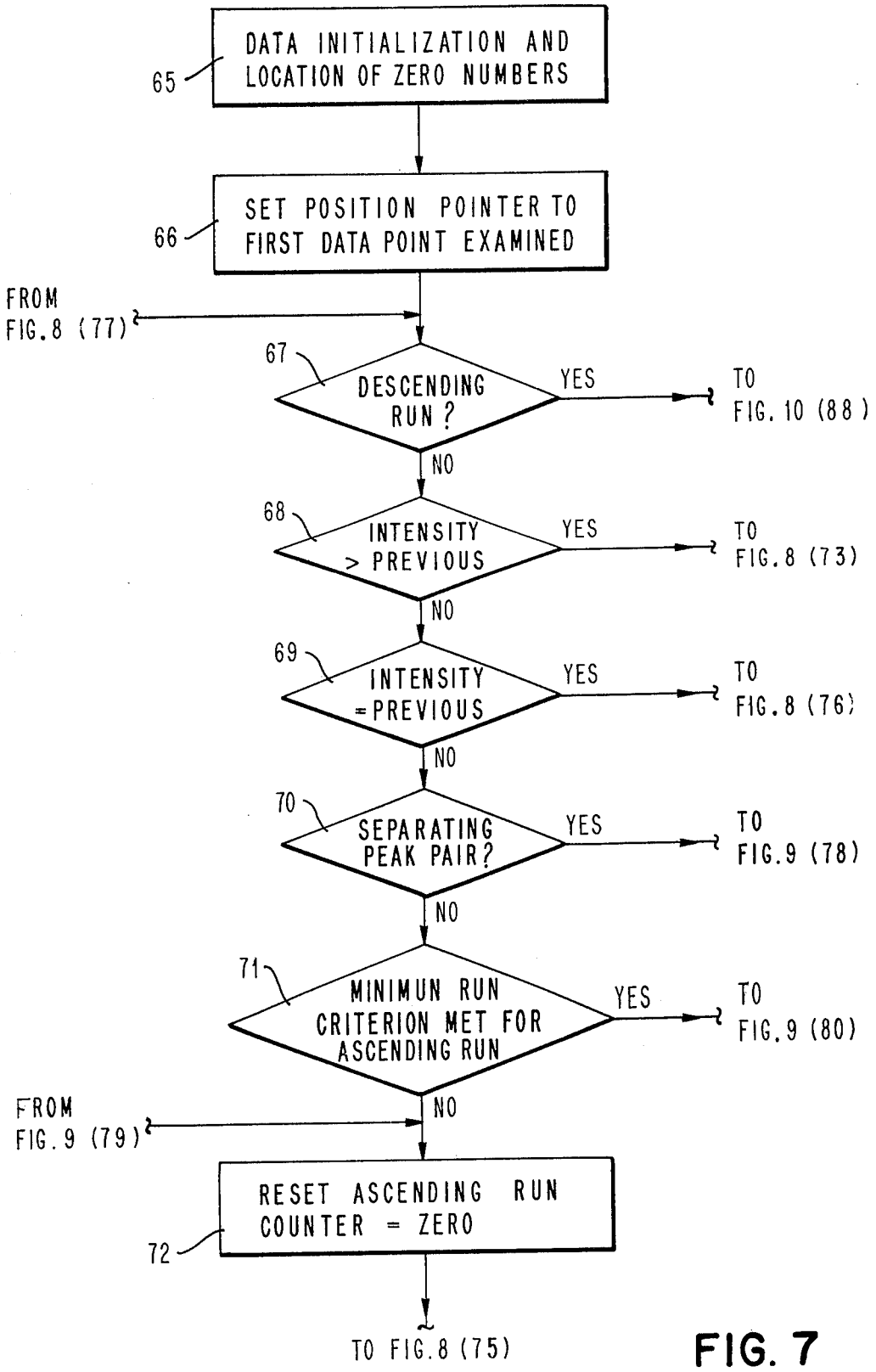
Figure 8:
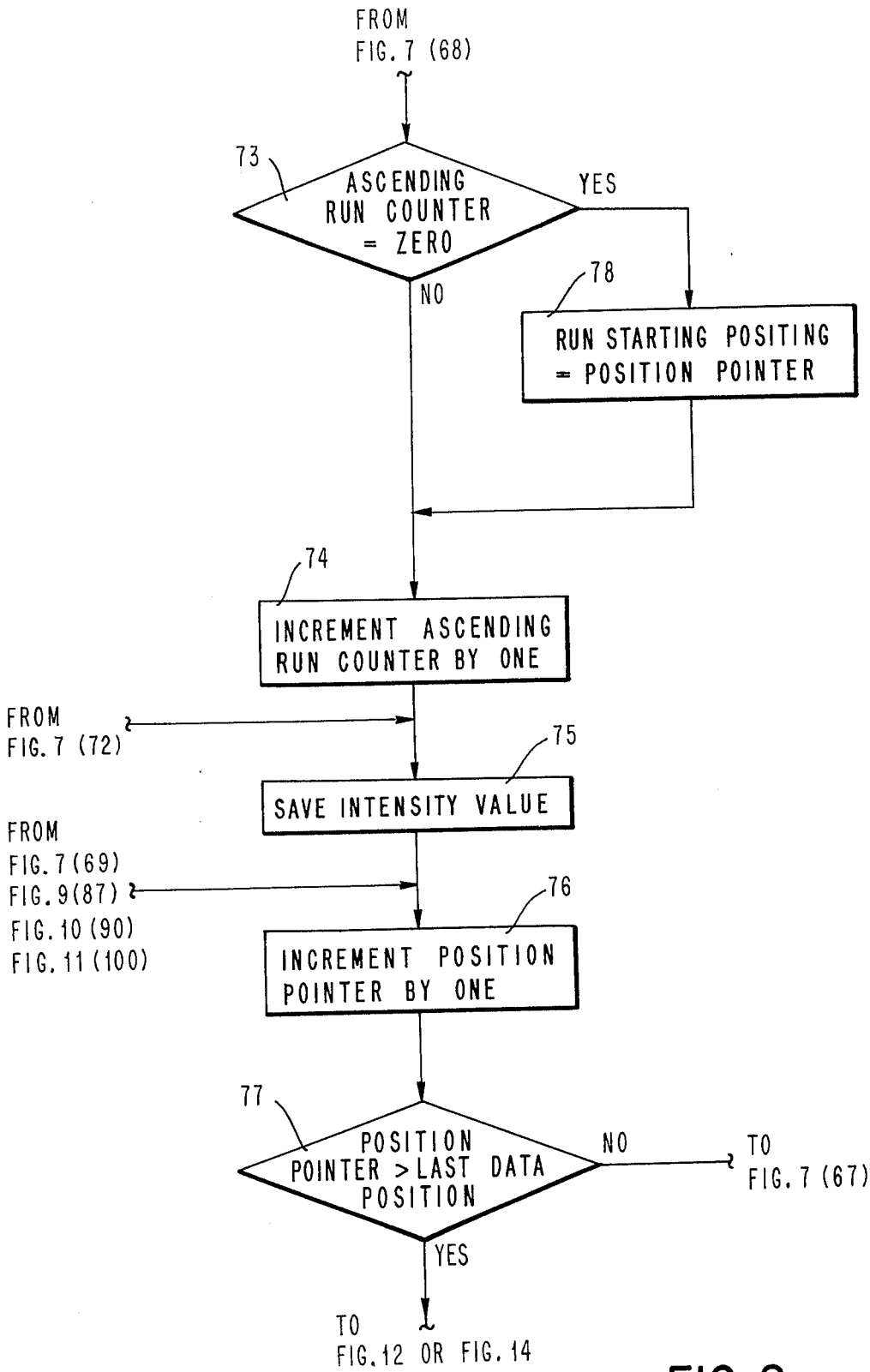
Figure 9:
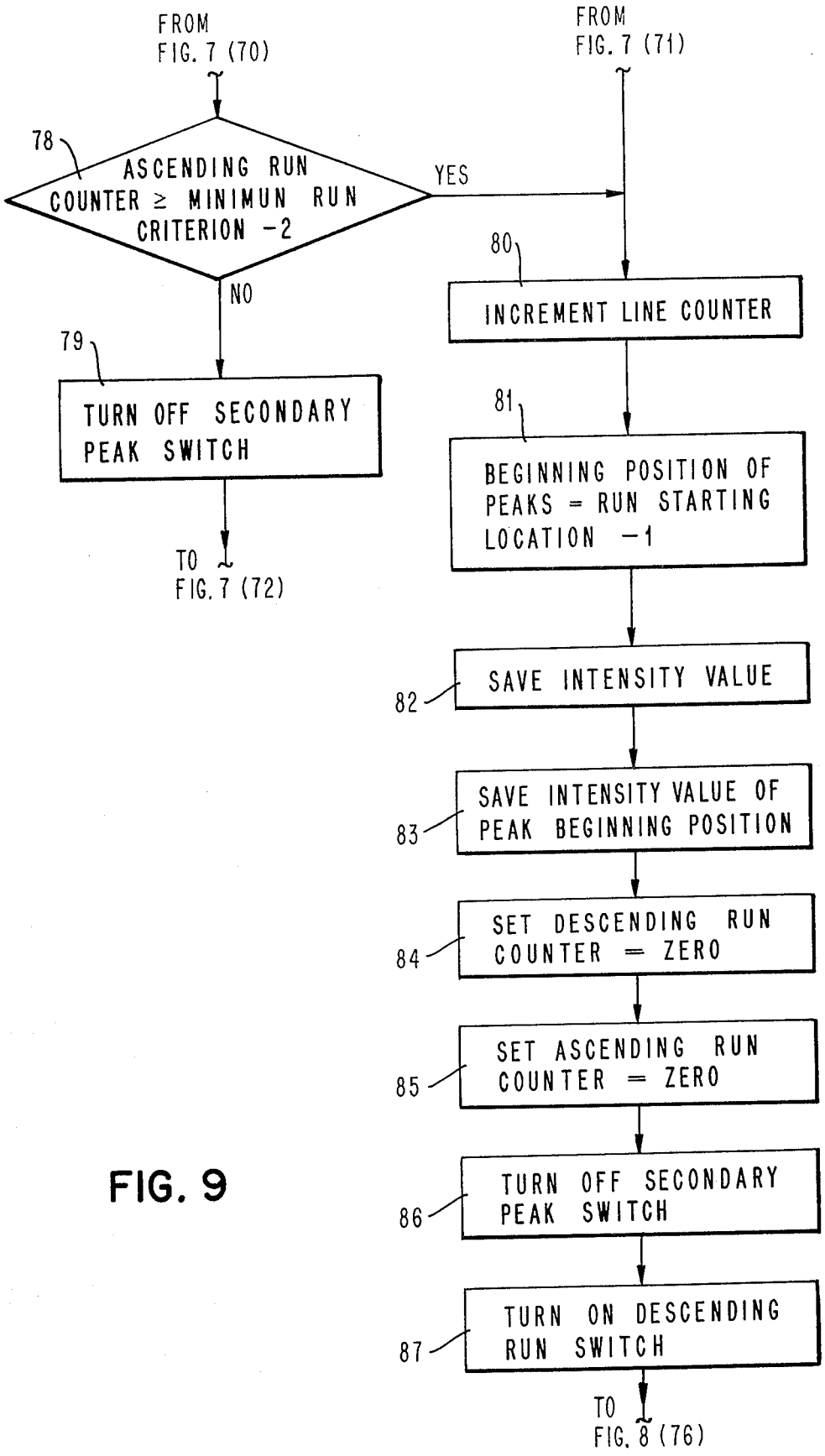
Figure 10:
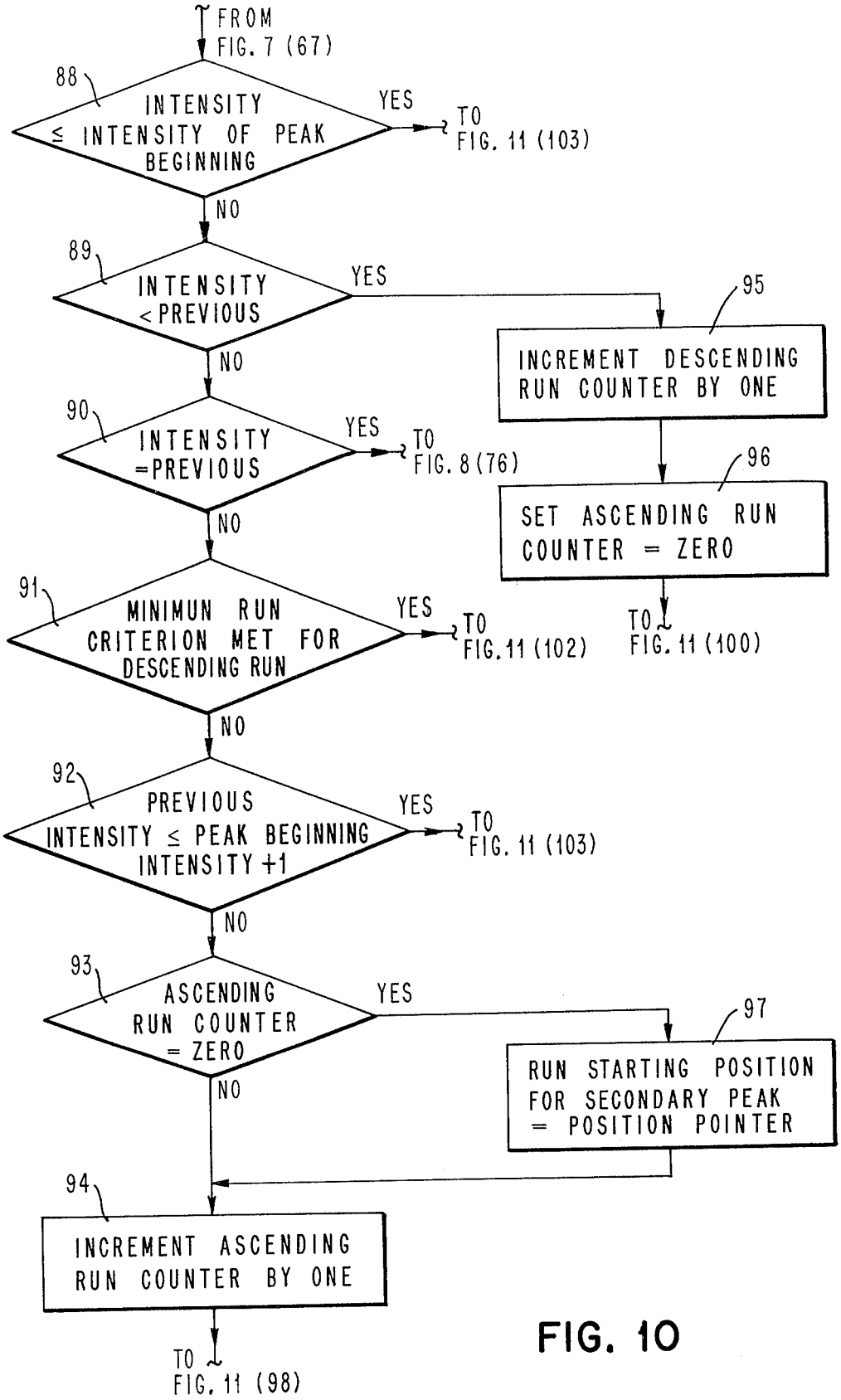
Figure 11:
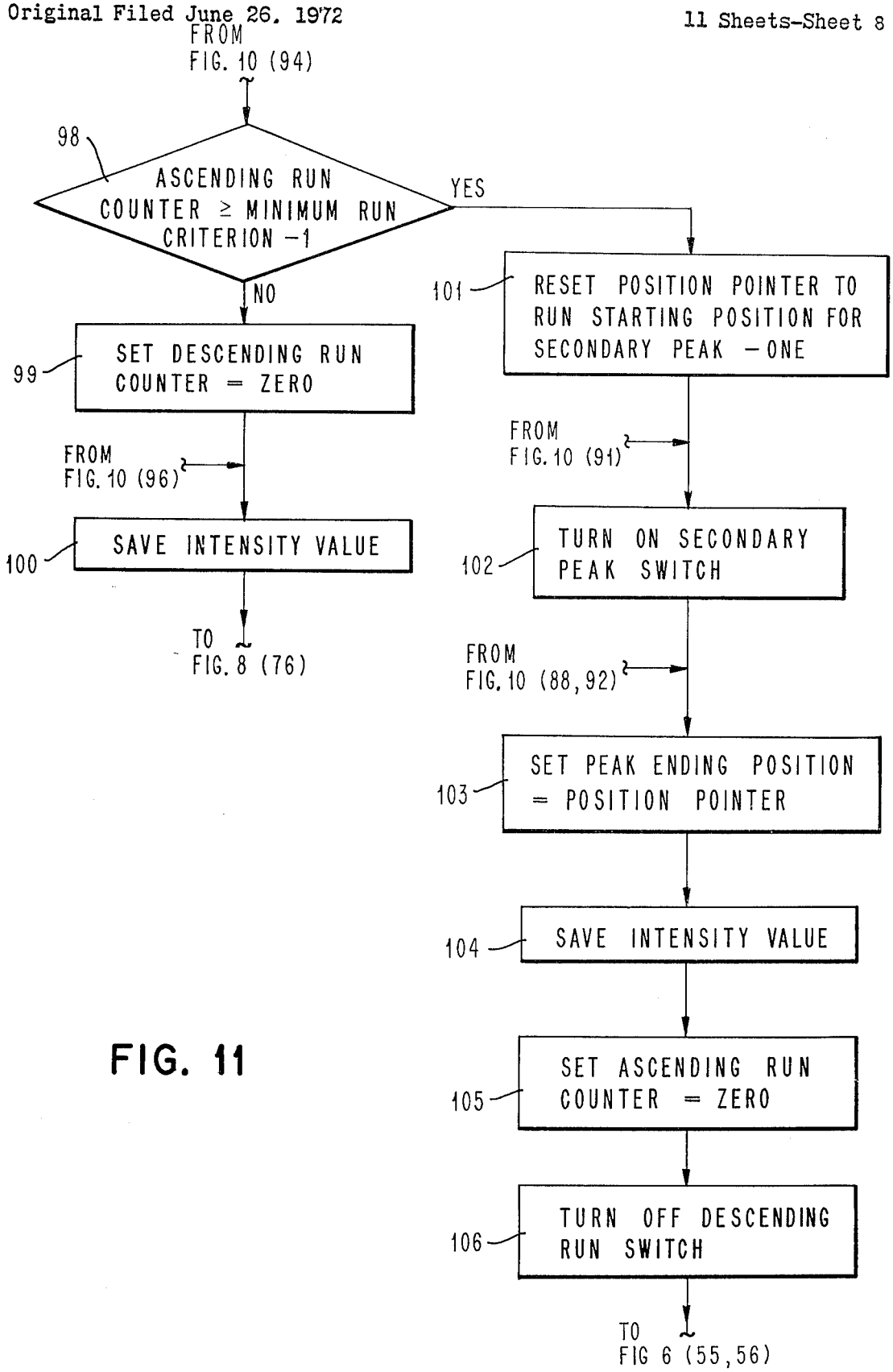
Figure 12:
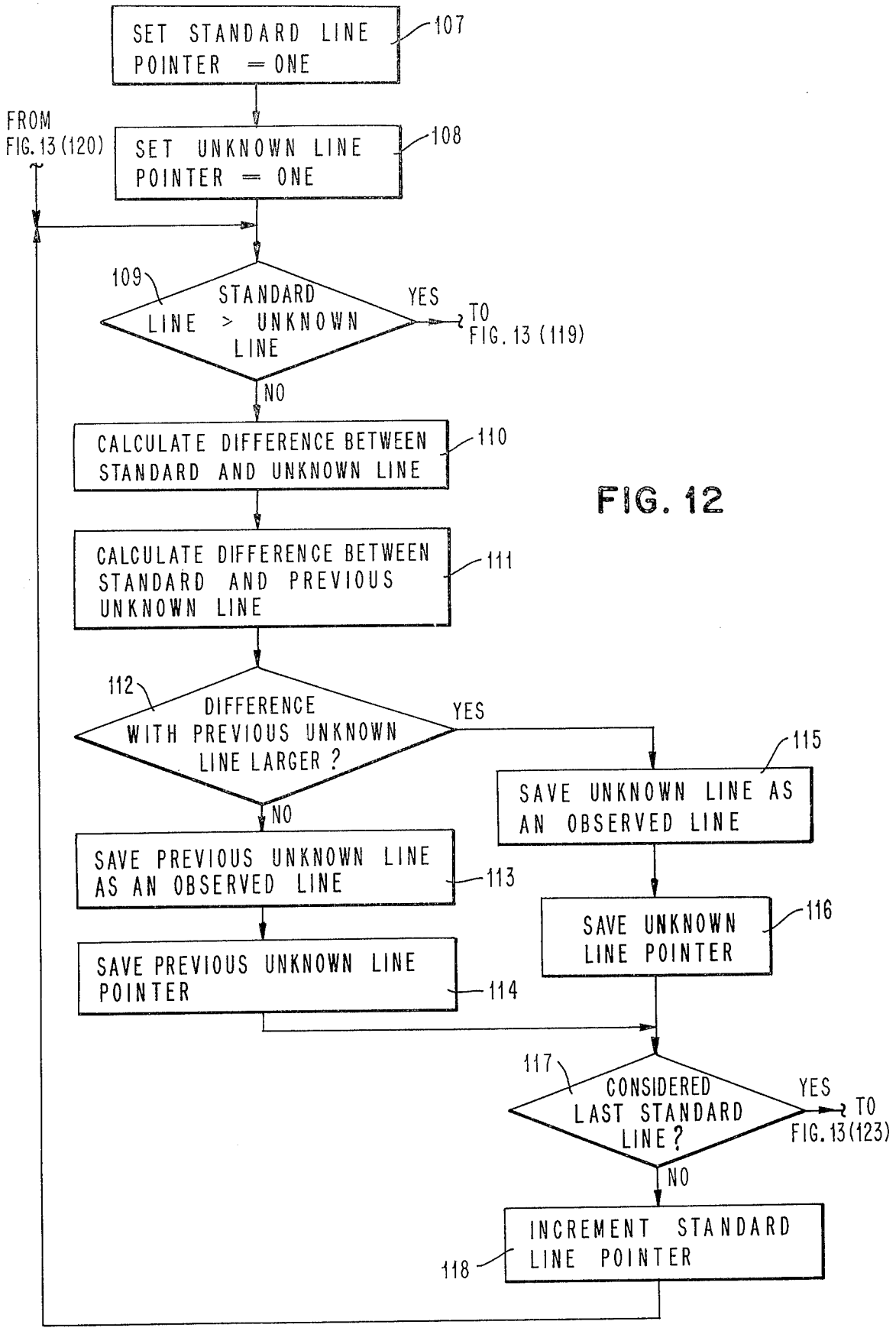
Figure 13:
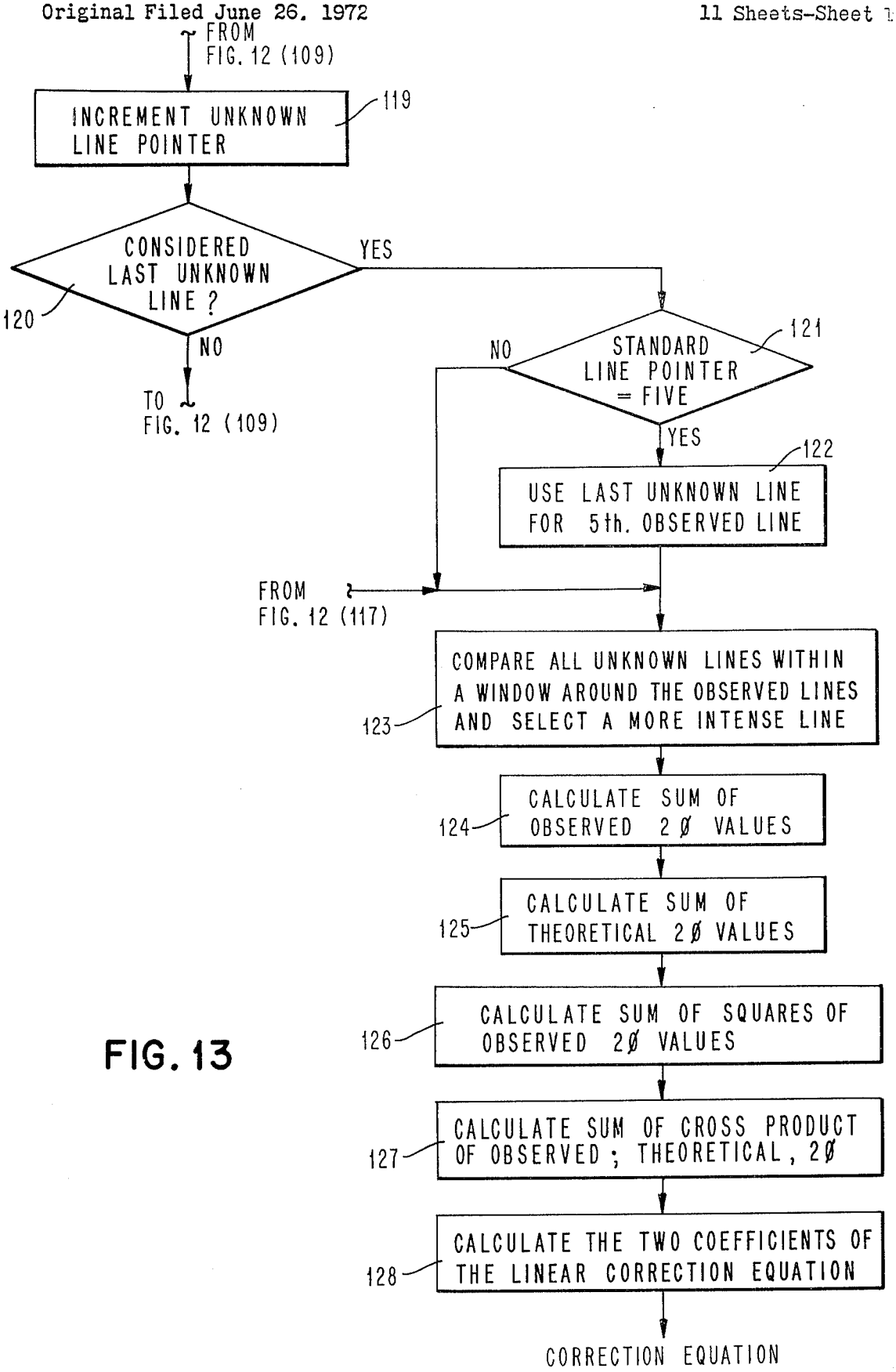
Figure 14:
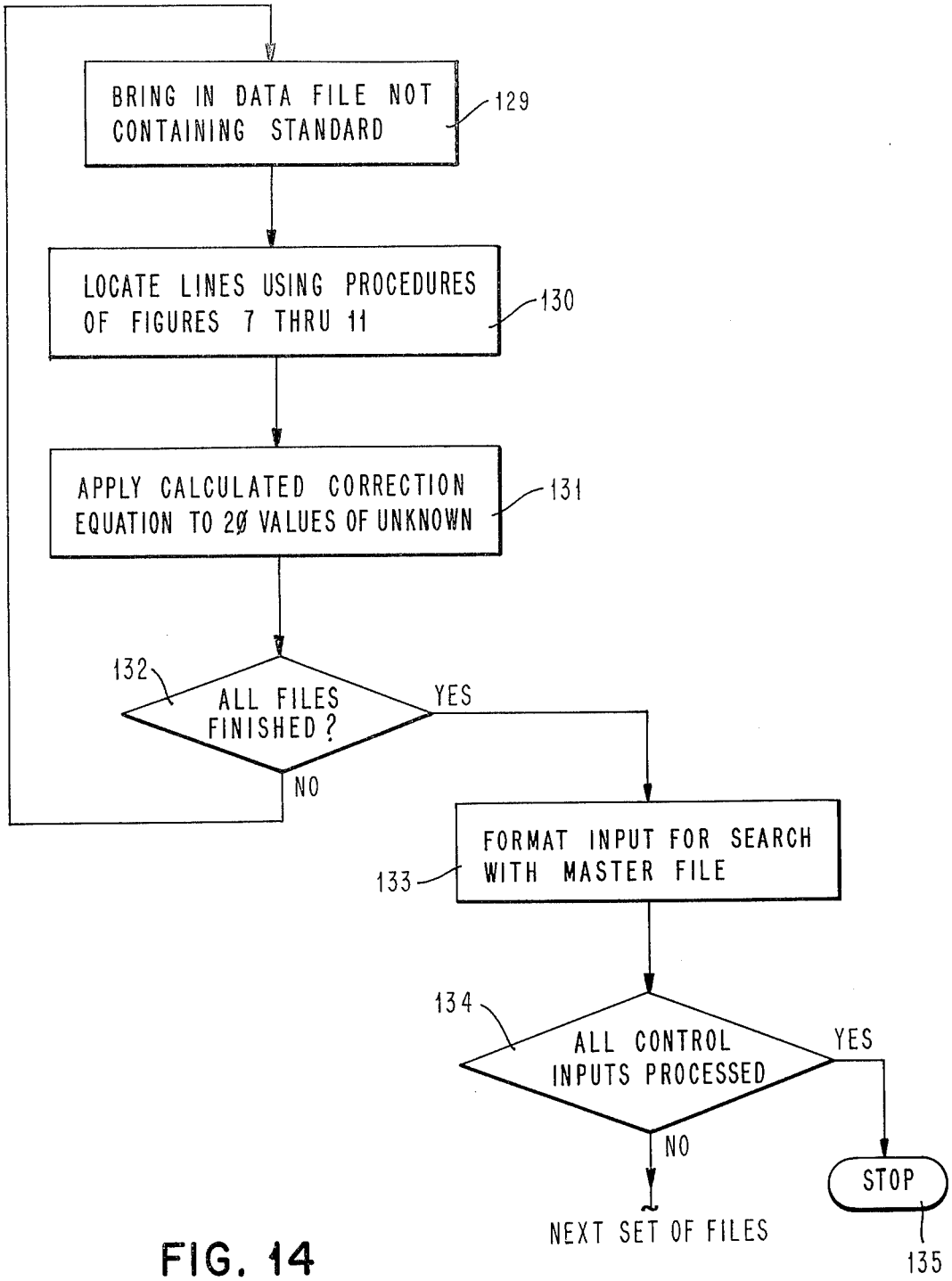

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED SEPTEMBER 2, 1975

938 O.G. 6

T938,002

METHOD OF SPECTRA ANALYSIS AND IDENTIFICATION

Ray L. Bieber, Wappingers Falls, and Carl F. Pihl, Hughsonville, N.Y., assignors to International Business Machines Corporation, Armonk, N.Y.

Continuation of application Ser. No. 266,119, June 26, 1972. This application Jan. 17, 1974, Ser. No. 434,149
Int. Cl. C06b *15/34*
U.S. Cl. 235—151.3
11 Sheets Drawing. 32 Pages Specification

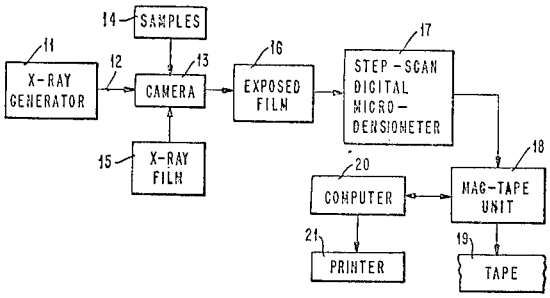

A method of analyzing and identifying line spectra. The method uses a known spectral data file to calculate a correction equation which is applied to the spectral data files for a series of unknown compounds. After developing the equation, it is applied to the unknowns which are then compared with a master search file to identify them.

METHOD OF SPECTRA ANALYSIS AND IDENTIFICATION

Original Filed June 26, 1972 11 Sheets-Sheet 1

METHOD OF SPECTRA ANALYSIS AND IDENTIFICATION

Original Filed June 26, 1972 11 Sheets-Sheet 2

METHOD OF SPECTRA ANALYSIS AND IDENTIFICATION

Original Filed June 26. 1972 11 Sheets-Sheet 3

METHOD OF SPECTRA ANALYSIS AND IDENTIFICATION

Original Filed June 26, 1972 11 Sheets-Sheet 4

METHOD OF SPECTRA ANALYSIS AND IDENTIFICATION

Original Filed June 26, 1972 11 Sheets-Sheet 5

METHOD OF SPECTRA ANALYSIS AND IDENTIFICATION

Original Filed June 26, 1972 11 Sheets-Sheet 7

METHOD OF SPECTRA ANALYSIS AND IDENTIFICATION

Original Filed June 26, 1972 11 Sheets-Sheet 8

METHOD OF SPECTRA ANALYSIS AND IDENTIFICATION

Original Filed June 26, 1972 11 Sheets-Sheet 10